April 6, 1965 D. E. FRANZEN 3,176,456
ASPARAGUS HARVESTER
Filed Feb. 14, 1961 6 Sheets-Sheet 1

INVENTOR
Donald E. Franzen
BY Popp and Sommer
ATTORNEYS

April 6, 1965   D. E. FRANZEN   3,176,456
ASPARAGUS HARVESTER
Filed Feb. 14, 1961   6 Sheets-Sheet 2

INVENTOR
Donald E. Franzen
BY Popp and Sommer
ATTORNEYS

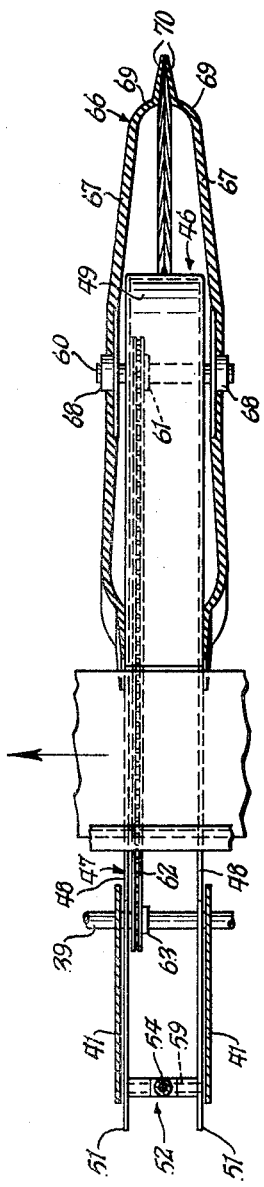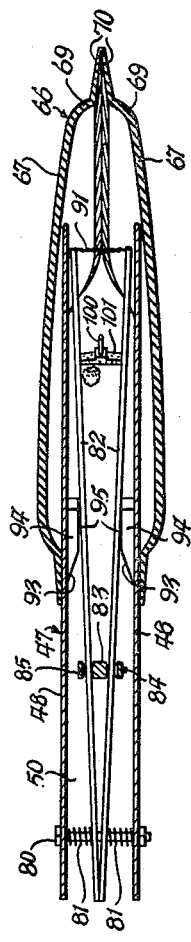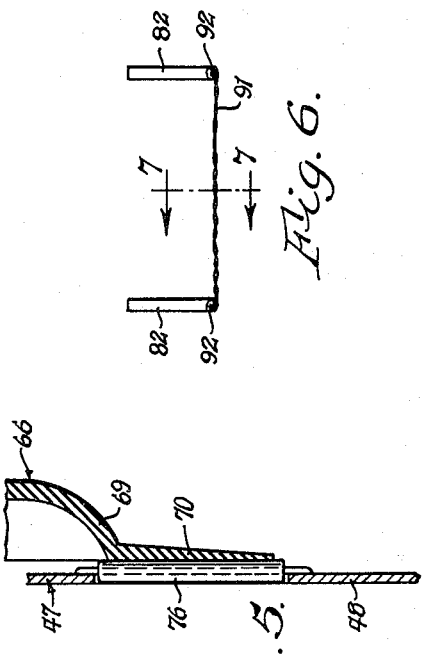

April 6, 1965 D. E. FRANZEN 3,176,456
ASPARAGUS HARVESTER
Filed Feb. 14, 1961 6 Sheets-Sheet 4
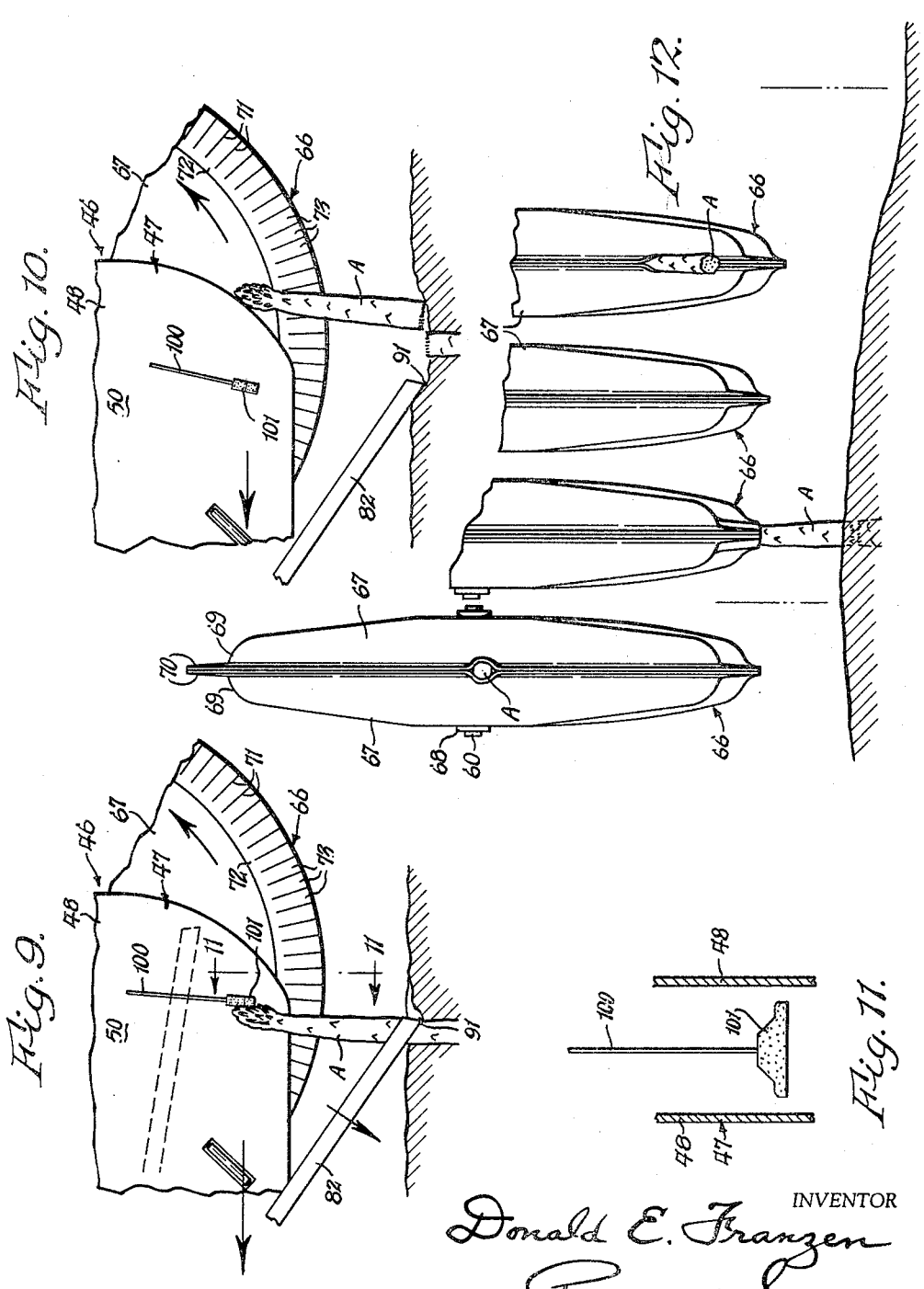
INVENTOR
Donald E. Franzen
BY Popp and Sommer
ATTORNEYS April 6, 1965   D. E. FRANZEN   3,176,456
ASPARAGUS HARVESTER
Filed Feb. 14, 1961   6 Sheets-Sheet 5
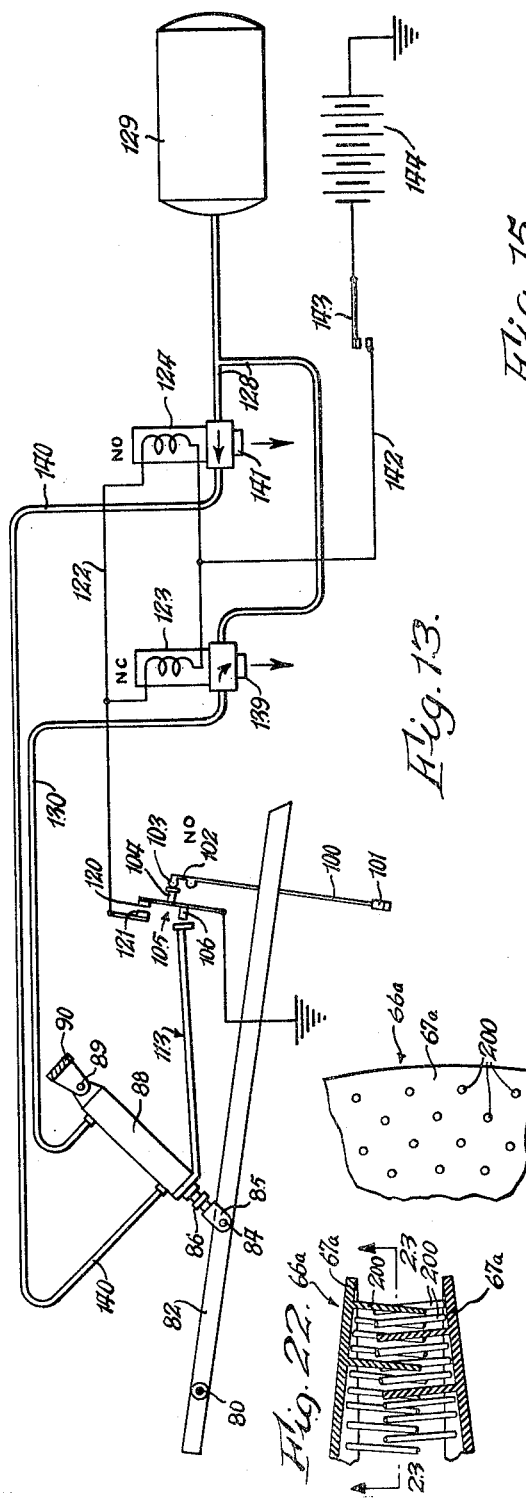
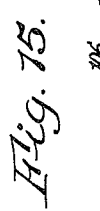
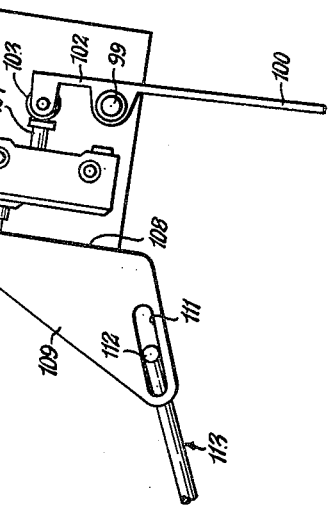
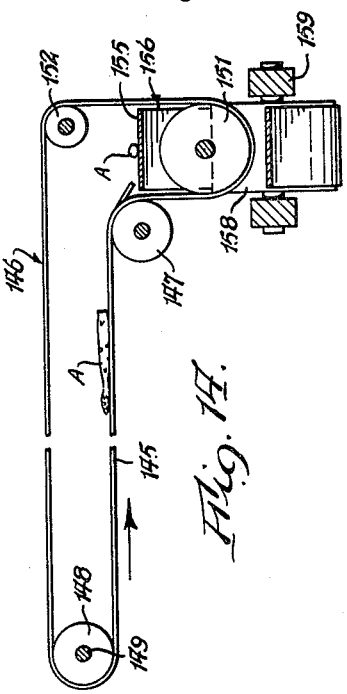
INVENTOR
Donald E. Franzen
BY Popp and Sommer
ATTORNEYS April 6, 1965 D. E. FRANZEN 3,176,456
ASPARAGUS HARVESTER
Filed Feb. 14, 1961 6 Sheets-Sheet 6
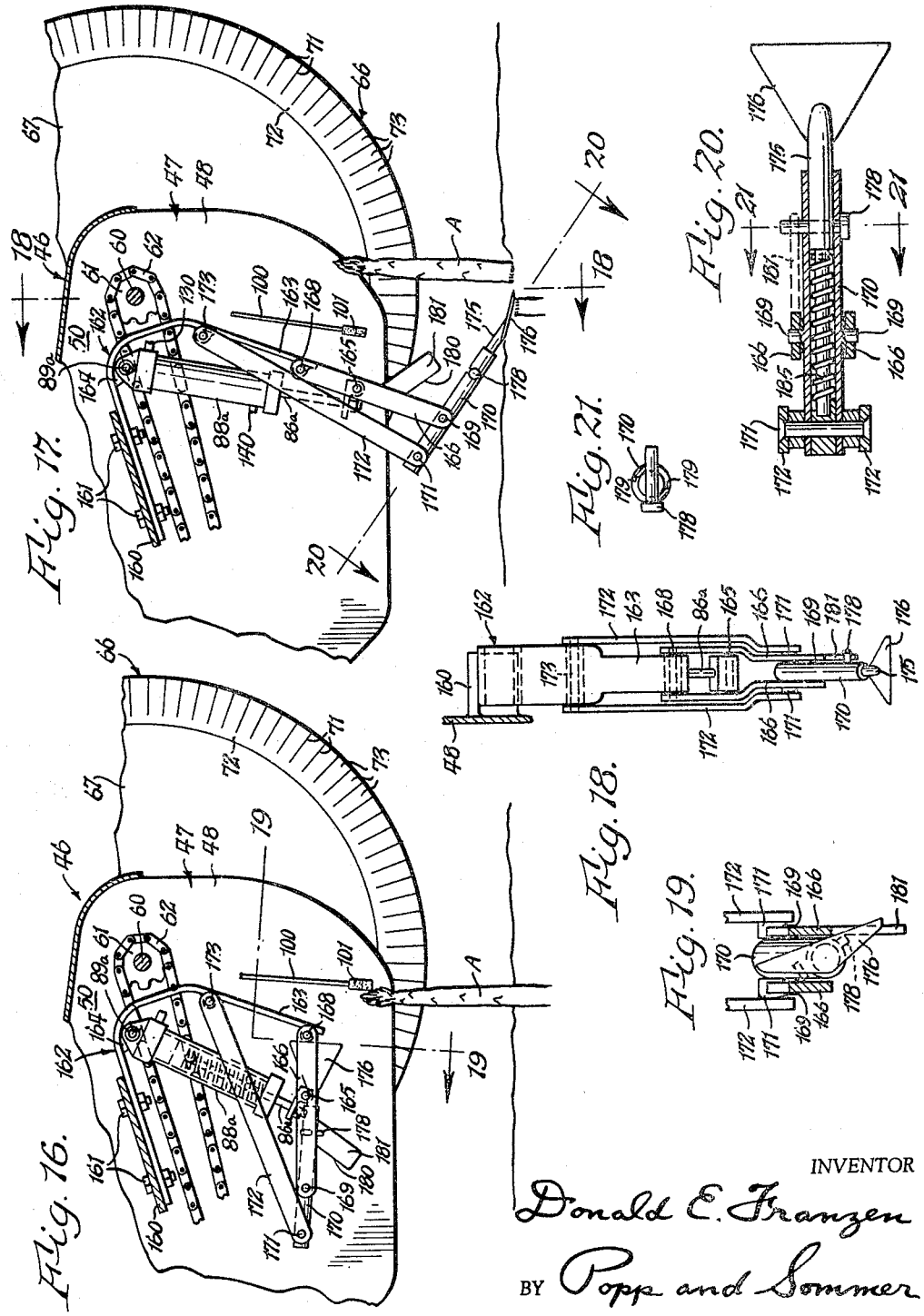
INVENTOR
Donald E. Franzen
BY Popp and Sommer
ATTORNEYS

3,176,456
ASPARAGUS HARVESTER
Donald E. Franzen, Monroeville, N.J.
Filed Feb. 14, 1961, Ser. No. 89,288
15 Claims. (Cl. 56—327)

This invention relates to a method and harvester for picking asparagus spears and more particularly to such method and harvester embodied in a mobile asparagus picker which is propelled along the field and which includes a plurality of units each having a sensing, cutting, grasping and conveying or transfer mechanism arranged so that a spear of growing asparagus of marketable, preferably premium grade size, in the path of any one of the units will be sensed by the sensing mechanism, this in turn actuating the cutting mechanism to sever the sensed asparagus spear below ground, the grasping mechanism seizing the cut asparagus spear from opposite sides before it can fall to the ground and elevating it and depositing it gently and butt first into a transverse conveyor serving all of the units.

An important object of the invention is to provide such a method and apparatus for harvesting growing asparagus spears which is very gentle in its action and which, except for the rapid movement of the cutter in severing the asparagus spears below ground is slow and gentle in its action thereby to avoid injury to the spears, particularly their tips.

Another object is to provide such a method and harvester, which is adapted to any accepted cultural practices for asparagus, such as the type and height of the ridge of earth usually progressively built up in asparagus fields primarily for weed control.

Another object is to provide such a method and harvester which is highly selective to pick only growing spears which have reached a predetermined height.

Another object is to provide such a method and apparatus which results in minimum damage both to the spear cut and also to the undersize spears left in the field.

Another important object is to provide such a method and apparatus in which the tender heads of the asparagus spears are never bruised, the cut spears being seized at the base and elevated and then transported butt first to one or more belt conveyers.

Another object is to provide such a method and apparatus which will cut a wide swathe of marketable asparagus spears and which apparatus travels at a high rate of speed, in the order of three or three and one half miles per hour, so that the asparagus field can profitably be harvested at frequent intervals to obtain only premium grade spears in prime condition, leaving immature and shorter spears for a subsequent harvesting. By such frequent selective picking of the marketable spears, the strength of the plants is constantly directed to bringing spears to premium grade thereby not only to provide a crop of maximum market value, but also to provide such premium grade spears in maximum quantity since no plant strength is wasted on spears which have reached premium grade.

Another object is to provide such a harvester which will not injure, in fact will not normally even touch such immature shorter spears, but leaves them undisturbed to grow to premium grade.

Another object is to provide such an asparagus picker which is highly selective and which is readily adjustable to pick only spears which have reached the height which the operator has decided to harvest.

Another object is to provide such an asparagus picker in which the spears are, in effect, marshalled into narrow rows by passing between a series of closely spaced vertical fore-and-aft plates and between which the sensing and cutting of the premium grade spears is effected.

Another object is to fully protect the sensing and cutting mechanisms against injury.

Another object is to provide a rotary grasping and elevating mechanism the bottom part of which moves at a speed and in such direction as to be substantially stationary with respect to the ground thereby to avoid the spear being jerked either forwardly or rearwardly after having been cut but instead gently seizing and elevating the same.

Another object is to provide a method in which the cut spear is gently grasped and swung in a circular path, butt radially outward, to a position where it is released butt first for movement in another direction, all movement being gentle and at a slow uniform speed related to the ground speed of the harvester so as to avoid injury to the spears, particularly the tender tips thereof.

Another object is to provide a method for subsequently transferring the procession of spears, butt first, from conveyer to conveyer, to marshall the picked asparagus without injury to the tender tips thereof.

Another object is to provide a cutter which is narrow to act only in its assigned zone and avoid injury to adjacent growing spears and which is rapid in its action to quickly and cleanly sever spears of selected height.

Another object is to provide such a cutter which is constructed and arranged so as not to interfere with the mechanism which grasps the cut spear before falling to the ground.

Another object is to provide such a cutter the effective cutting edge of which increases on approaching the base of the spear and diminishes on retreating from the cut spear, thereby to permit the cut spear to be immediately grasped and also to harvest spears, the tips of which are in the path of the sensor but the bases of which are not.

Another object is to provide such a cutter which is essentially operated from motion derived from the forward movement of the harvester, the cutter actuating mechanism essentially merely bringing the cutting edge to cutting position in advance of a selected spear.

Another object is to provide such a cutter which is not subject to damage or dulling by stones, grit or other ground conditions.

Another object is to provide such a cutter in which its cutting edge can be readily replaced in the field.

Another object is to provide a sensing mechanism which is not interfered with by the spear cutting, grasping, or elevating mechanisms.

Another object is to provide such apparatus which is adapted to side hill operation, particularly in point of the spear grasping members which, if not readily flexible, would quickly bend out of useful shape on side hill harvesting.

Another object is to provide such a harvester in which there is no interference between components for different functions with resultant malfunction, such as the cutter striking and actuating the sensor to recycle these components uselessly and rapidly.

Another object is to provide such a harvester in which each unit is in the form of a separate subassembly readily removable and replaceable in the event of breakdown.

Another object is to provide such a harvester in which dirt, weeds or other foreign matter are continuously being scraped from the operative faces of the rotors which grasp and elevate the spears, thereby to maitain these faces in an operative condition.

Other objects and advantages of the invention will be apparent from the following description and drawings in which:

FIG. 3 is a fragmentary horizontal section taken generally on line 3—3, FIG. 2.

FIG. 4 is a fragmentary horizontal section taken generally on line 4—4, FIG. 2.

FIG. 5 is an enlarged fragmentary generally vertical section taken on line 5—5, FIG. 2.

FIG. 6 is an end elevational view of the outboard extremity of one of the cutters.

FIG. 7 is an enlarged side elevational view of the cutting blade used in the cutter, this being shown as comprising three twisted strands of .010 tungsten steel alloy wire.

FIG. 8 is an enlarged vertical section taken generally on line 8—8, FIG. 6.

FIG. 9 is a fragmentary view similar to FIG. 2 and showing a growing asparagus spear of marketable size actuating a sensor and this in turn actuating the cutter.

FIG. 10 is a view similar to FIG. 9 showing the cutting completed.

FIG. 11 is an enlarged sectional view taken generally on line 11—11, FIGS. 2 and 9.

FIG. 12 is a rear elevational view of part of the group of flexible rotors or disks which grasp the cut asparagus spears from opposite sides and elevate them.

FIG. 13 is a schematic representation of the hydraulic and electrical circuit for each sensor and cutter.

FIG. 14 is a fragmentary vertical transverse section taken generally on line 14—14, FIG. 2, but showing only the endless conveyer belts which transport the cut asparagus spears away from the grasping and elevating mechanisms which deposit the cut spears on the first of these belts.

FIG. 15 is a fragmentary enlarged view similar to FIG. 2 and showing the manner in which the return movement of the cutter operates to reset the switch actuated by the sensor.

FIG. 16 is a fragmentary view similar to FIG. 2 and showing a modified form of cutter, the cutter being shown in its inoperative position.

FIG. 17 is a view similar to FIG. 16 showing the cutter moved to its operative position.

FIG. 18 is a fragmentary vertical section taken generally on line 18—18, FIG. 17.

FIG. 19 is a fragmentary vertical section taken generally on line 19—19, FIG. 16.

FIG. 20 is a fragmentary section taken generally on line 20—20, FIG. 17.

FIG. 21 is a transverse section taken generally on line 21—21, FIG. 20.

FIG. 22 is a fragmentary view similar to FIG. 3 showing a modified form of the invention.

FIG. 23 is a fragmentary vertical section taken generally on line 23—23, FIG. 24.

Figure 1:
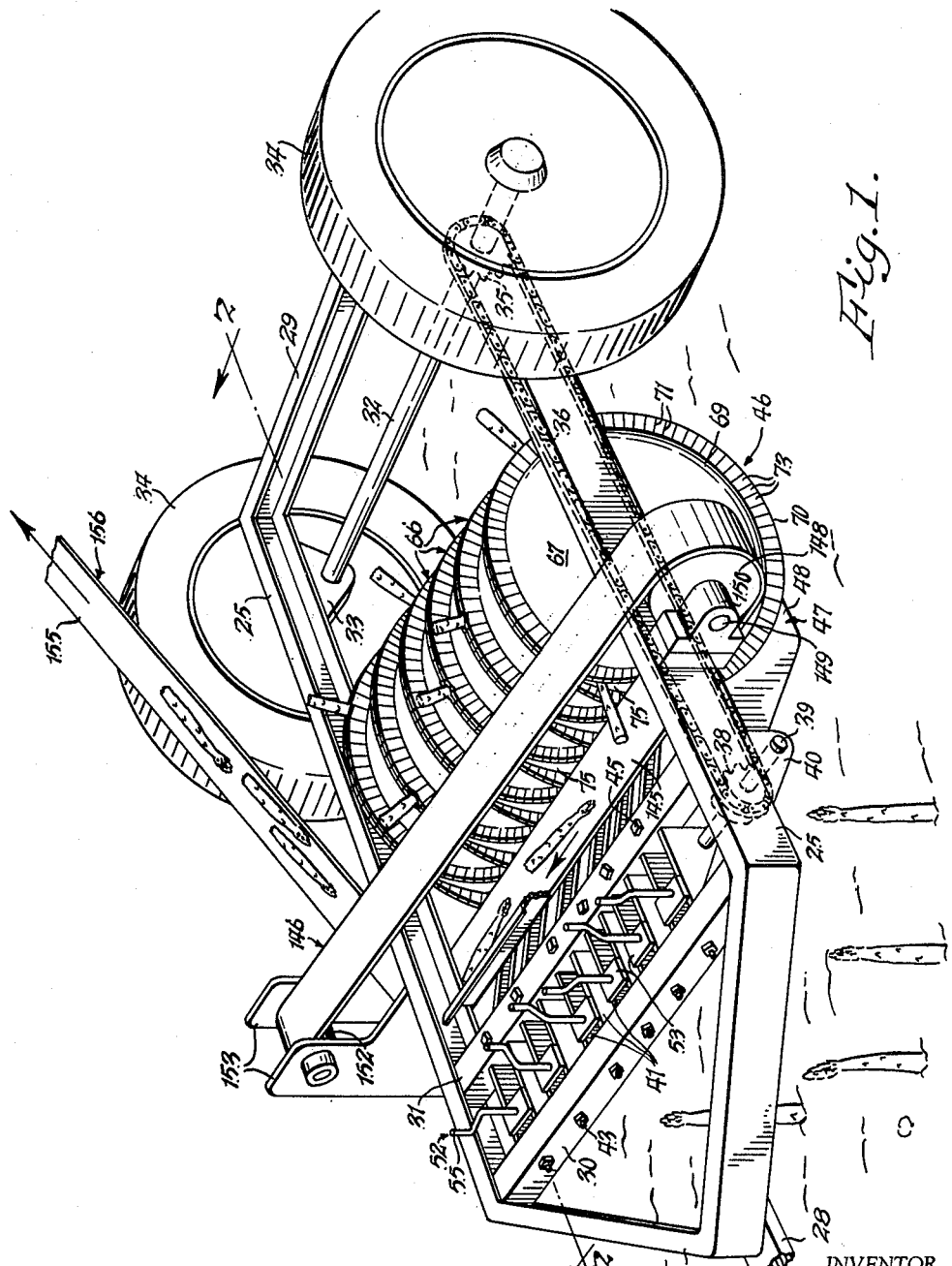
FIG. 1 is a perspective view of a harvester for growing asparagus spears embodying and adapted to practice the present invention.

The chassis of the asparagus picker comprises main longitudinal side frame beams 25 connected at their front ends by forwardly converging cross beams which form a nose or prow 26 to which a drawbar 28 is suitably connected and through which the asparagus picker is drawn along the ground by a farm tractor (not shown). The chassis includes a rear cross bar 29 and a pair of parallel closely spaced cross bars 30, 31 near its front end. The rear end of the chassis is supported on an axle 32 journalled in axle brackets 33 and supported by ground engaging wheels 34 which are fast to the axle to drive certain parts of the asparagus picker as hereinafter described. The front end of the chassis is supported through the drawbar 28 on the tractor which is not shown.

Figure 2:
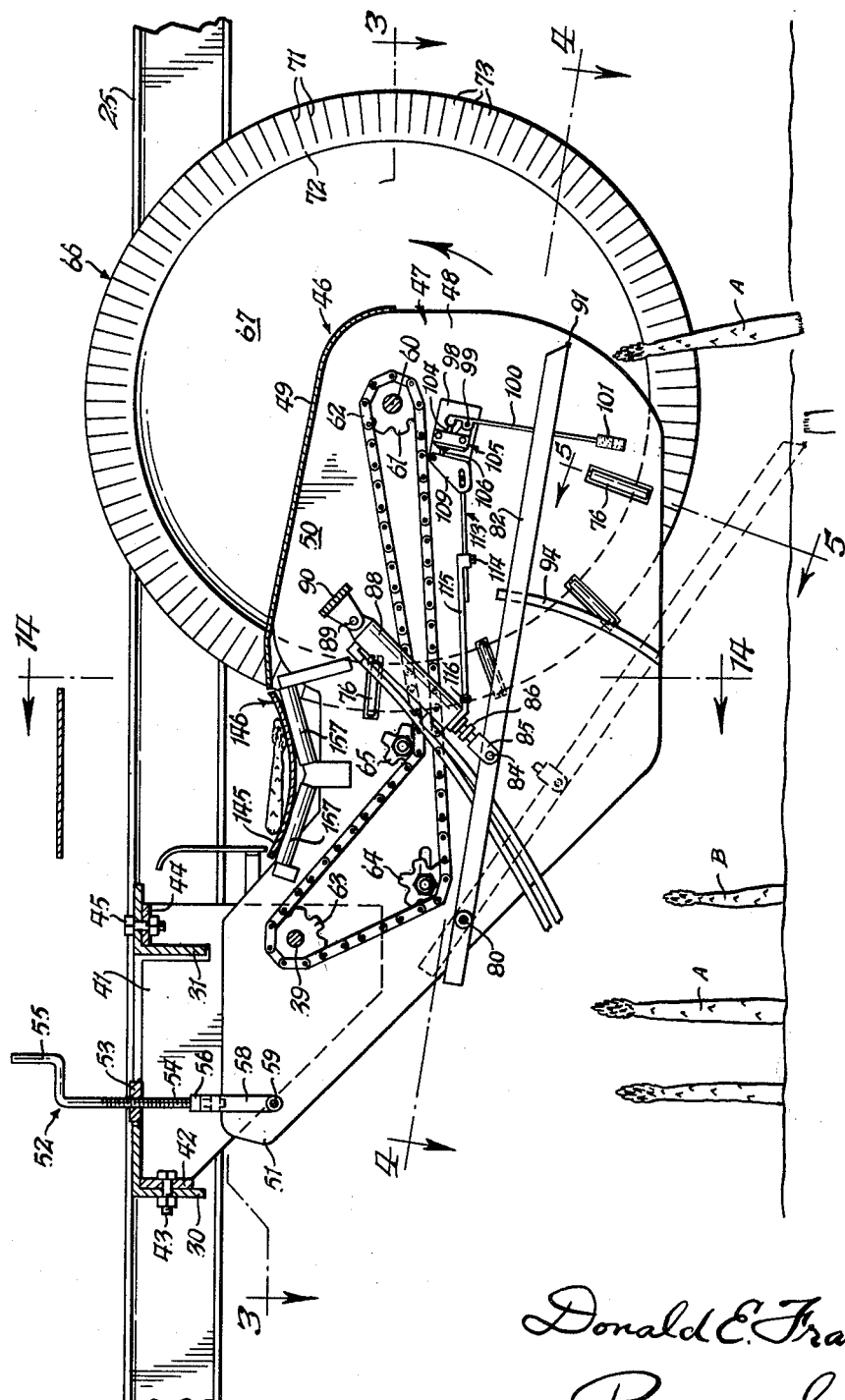
FIG. 2 is an enlarged fragmentary vertical longitudinal section taken generally on line 2—2, FIG. 1.

The numeral 35 represents a sprocket fast to one end of the axle 32 and driving, through a chain 36, a sprocket 38 fast to one end of a cross shaft 39, the latter being journalled in frame brackets 40 fixed to the main longitudinal side frame beams 25 intermediate the pair of closely spaced cross beams 30, 31. This cross shaft 39 is also journalled in a plurality of pairs of frame brackets 41 bolted in parallel spaced relation to the frame cross beams 30, 31. For this purpose, as best shown in FIG. 2, each of these brackets 41 is in the form of a vertical plate extending fore-and-aft and having a front ear 42 bolted, as indicated at 43, to the frame cross beam 30 and a rear ear 44 bolted, as indicated at 45, to the frame cross beam 31.

This cross shaft 39 adjustably supports a plurality of individual picker units, indicated generally at 46, which are arranged side-by-side transversely of the chassis so as to pick all asparagus spears of the selected height in the path of the asparagus picker between the main longitudinal side beams 25. These picker units are identical in construction and hence a description of one will be deemed to apply to all, the asparagus picker being shown as having six picker units.

Each picker unit 46 is mounted on a vertically adjustable arm indicated at 47, these arms being arranged side-by-side transversely of the machine and being supported at their forward ends on the cross shaft 39 which can turn in these arms. Each of these arms 47 is composed of a pair of closed spaced, parallel, vertical fore-and-aft plates 48 connected along their top at their outboard ends by an integral cross part 49 so as to provide a chamber or way 50, which is open at its front, bottom and rear and contains the mechanism for sensing asparagus spears of predetermined height as well as a cutting mechanism for severing such spears of predetermined height from their roots.

The plates 48 of each of the arms 47 have noses or elevated prows 51 which project forwardly from the cross shaft 39 on which the arms 47 are rockably mounted and connect with an adjusting mechanism indicated generally at 52. As best shown in FIGS. 1 and 2 the adjusting mechanism for each arm 47 comprises a nut 53 welded to bridge a corresponding pair of brackets 41 which support the cross shaft 39, each nut 53 supporting the threaded vertical shank 54 of a hand crank 55. The lower end of each of these shanks 54 has a rotatable connection 56 with one end of a link 58, the lower end of this link being pivotally connected to a cross pin 59 secured to and bridging the space between the forward ends of the noses or prows 51 of the side plates 48 of each arm 47. It will be seen that turning the crank 55 works the shank 54 up or down in its nut 53, thereby to raise or lower the forward end of the corresponding arm 47 rockably supported on the cross shaft 39. This raises or lowers the rear end of the arm 47 thereby to raise or lower the sensing and cutting mechanism carried by each arm.

A cross shaft 60 is suitably journalled in the upper rear part of each arm 47 to bridge the space or way 50 between the side plates 48 thereof. A sprocket 61 is fast to one end of each of these cross shafts 60 within the chamber or way 50, this sprocket being connected by a chain 62 with a corresponding sprocket 63 fast to the cross shaft 39. Each chain 62 passes over idler sprockets 64 and 65 which guide this chain so as to avoid interference with other parts of the picking mechanism.

A flexible spear grasping and elevating rotor, indicated generally at 66, is fixed to the end of each cross shaft 60 projecting outwardly from the side plates 48 of each arm 47, these flexible rotors thereby being arranged externally of each arm 47 and the opposite side plates 48 thereof. These flexible rotors can be of various forms, their essential function being to grasp the asparagus spear, immediately following its cutting, from opposite sides, to elevate the same for subsequent transfer to a conveyor serving all of the arms 47 and to release it to fall butt first on this conveyer. To this end each of the flexible rotors 66 is shown as comprising a rubber disk 67 having a fixed metal hub 68 fast to each end of its cross shaft 60 and having an axially and outwardly curving rim portion 69 terminating in a radially projecting peripheral portion 70. It will therefore be seen that each of the disks 67 is in the form of a pan-shaped rubber disk fixed to the end of its shaft 60 and having radially projecting peripheral portions, the latter being arranged in generally parallel relation to one another and the outermost extremities of these peripheral portions 70 of each pair of disks 67 being biased axially into normal pressure contact with each other as best shown, in FIGS. 3 and 4. For increased sensitivity and rapidity in grasping action, the pheripheral portions 70 of each picking disk 67 are provided with a uniformly spaced series of radial slits 71 extending inwardly from the periphery to a point short of the curving rim portion 69 thereof so as to provide an uninterrupted grasping surface 72 extending completely around each disk at the inner ends of radial fingers 73 provided by these slits 71.

While each pair of rubber disks 67 is mounted so as to normally have axial pressure contact with each other at their peripheries, these disks are spread apart at one side to receive the cut asparagus spears which they are to grasp, this spreading apart being effected by the spaced side plates 48 of the picking arms 47. Thus, the disks are rotated by the chains 62 in the direction of the arrow shown in FIG. 2 and their sides travel along the exterior of the side plates 48 and engage the tops of these side plates 48 at about their 10 o'clock position. Accordingly, each pair of rubber disks 67 are spread apart beginning at about the 11 o'clock position, on encountering the upper ends of the side plates 48 to provide a V-shaped opening 75 between each pair of disks 67, this V-shaped opening or spread of each pair of disks being used for discharging the cut asparagus spears as hereinafter described.

On leaving the lower edges of the plates 48 of each arm 47 the peripheral portions 70 of each pair of rubber disks come together again at about their 6 o'clock position. At this point, they grasp the spear of any asparagus spear advancing into the way or chamber 50 and if this spear is of sufficient height to have been severed by the cutting mechanism the pair of flexible disks 67, grasps this spear and lifts it upwardly from the ground. In order to avoid surface friction between the rubber disks 67 and the outer faces of the side plates 48 of the arms 47, rollers 76 are mounted in each side wall 48, the axes of which rollers are radially disposed with reference to their cross shaft 60 and these rollers being arranged to contact the continuous contact portion 72 of each flexible disk 67.

Each picking arm 47 has a mechanism for cutting, below ground, spears of asparagus of predetermined height passing through the way or chamber 50 between the pair of side plates 48 of each arm, each cutting mechanism being shown as actuated hydraulically and being constructed as follows:

The numeral 80 represents a cross pin supported by and bridging the space or way 50 between the pair of side plates 48 of each picking arm 47. Each pin 80 carries a helical compression spring 81 at each of its ends and interposed between these springs 81 and swingably mounted or journalled on the center of each pin 80 is a pair of cutter arms 82 in the form of metal bars which project rearwardly in the way or chamber 50 and have their rear ends terminating at the rear end thereof. The springs 81 hold the forward ends of each pair of cutter arms 82 in contact with each other as best shown in FIG. 4, and the rear ends and intermediate ends of these arms are separated by a block 83 having opposite pivot pins 84 projecting through these arms and connecting with the depending sides of a yoke 85 at the lower end of the piston rod 86 for a piston contained within a cylinder 88. The upper end of the cylinder 88 is pivotally mounted, as indicated at 89, on a bracket 90 suitably secured to one side wall 48 of the corresponding arm 47.

The cutting edge is preferably provided by a number of metal wires 91 twisted together as indicated in FIGS. 7 and 8 and having their opposite ends secured, as by weldments 92, to the rear extremities of each pair of arms 82. Each of these wires 91 is preferably of 0.010 inch diameter and made of a tungsten steel alloy and it has been found that three of such wires twisted together as illustrated and brought below ground so as to encounted the subterranean part of an asparagus spear will rapidly and neatly sever the spear, below ground, from its root.

The use of such twisted wires also permits the bars 82 to each cutter to spread apart and come together in order to avoid contact with the sensor of the sensing mechanism. To this end as the arms 82 move upwardly they contact the salient portions 93 of a pair of cam bars 94, these cam bars 94 having lands 95 at their upper parts which hold the rear ends of the arms 82 together and out of contact with the side plates 48 of the picking arms 47.

When the rear or free ends of the two arms 82 pass beyond the lower ends of the cam bars 94, they are forced apart by the springs 81 the full distance permitted by the twisted cutting wires 91, this not only bringing these wires taut for cutting but also extending the arms beyond the vertical planes of the inside faces the side plates 48 of each arm 46 so that all asparagus spears of adequate height which pass through the way or chamber 50 within each cutting arm will be severed below ground. It will be noted that by this extension of the effective length of the cutting wires 91, their width of action is greater than the width of the way 50 so as to cut the bases of any spears pulled sidewise into the way, or leaning, so to have its base in whole or in part to one side of the downwardly projected area of the way.

The apparatus for sensing only those asparagus spears which have reached adequate height, preferably of such height as to be of premium grade, is constructed as follows:

The numeral 98 represents a bracket in the chamber or way 50 of each arm 47 and suitably secured to one wall or side plate 48 thereof. This bracket carries a horizontal pivot pin 99 extending transversely of the side plates 48 and supporting a sensing finger 100 which projects downwardly and can be in the form of a rod. At its lower end this sensing finger is shown as provided with a head 101 made of soft resilient plastic material, such as rubber, this head being elongated transversely of the side plates 48 and being of the maximum horizontal length which will clear the arms 82 of the cutter mechanism in the movement of the latter into and out of the chamber or way 50. Each rubber head 101 contacts the tip of an asparagus spear of harvesting height and the purpose of making it of soft resilient plastic material is to avoid injury to the tip of the spear. The purpose of making this head of transversely elongated form is to contact the tips of all asparagus spears of harvesting height which enter and pass through the corresponding way 50.

Each sensing finger 100 is provided with an upwardly extending portion 102 carrying a roller or other contact member 103 engaging with a horizontally moving operating member 104 of a normally open microswitch 105 on the bracket 98. It will be noted that by the arrangement of the sensing arm 100 and microswitch 105 as indicated, the microswitch is closed only in response to horizontal movement of the lower end of the sensing arm 100 caused by encountering an asparagus spear of harvestable height and that if either arm 82 of the cutter mechanism should strike the rubber head 101 at the bottom of any sensing arm 100, such contact will have no effect upon the microswitch 105 because it would result in a vertical force being applied to the sensing arm 100, and in a horizontal force required to move the sensing arm to close the normally open microswitch 105.

The microswitch has a second operating member 106 on the opposite side from the operating member 105 and which is operative to project the first operating member 104 rearwardly and thereby to both positively open the microswitch 105 and also restore the sensing arm 100 to its normal inoperative position. This operating member 106 of the switch is engaged by the rear face 108 of a lever 109 pivoted at 110 to the bracket 98. This lever 109 is provided with a horizontally elongated slot 111 containing the transversely extending end 112 of a push rod 113. This push rod is longitudinally adjustable, as by a set screw 114 in a push bar 115, pivoted, as indicated at 116, to the lower end of the cylinder 88.

The contacts of the microswitch 105 are designated at 120 and 121, FIG. 13, one of these contacts being grounded and the other being connected by a line 122 with the coil of a normally closed solenoid valve 123 connects the outlet line from a supply tank 129 of fluid under pressure, preferably oil, with a line 130 connected with the top of the cylinder 88, and when closed, the normally closed solenoid valve 123 connects the line 130 to drain 139. When open, a normally open solenoid valve 124 connects the supply line 128 with a line 140 connected with the bottom of the corresponding cylinder 88, and when closed, the normally open solenoid valve 124 connects this line 140 with a drain 141. The other sides of the coils of each solenoid valve 123, 124 are connected by a common line 142 for all of the solenoid valves on the harvester through a manual switch 143 to a battery 144 the opposite side of which is grounded.

The tip of each spear of asparagus after being cut and before the spear can topple over, are caught by the opposed peripheral portions 70 of the corresponding pair of rubber disks or rotors 67 and which peripheral portions spring toward engagement with each other at this time for the purpose of catching and embracing the body of the cut asparagus spear. This rotor is travelling in the direction of the arrow shown in FIG. 2 with its peripheral speed being substantially the same as the ground speed of the harvester so that the cut asparagus spear so seized is not tugged or jerked either forwardly or rearwardly on being so seized but is gently lifted by the rising sides of the pair of rubber disks which embrace it. These peripheral portions 70 also embrace and gently grasp undersize spears which are not ready for harvesting and are left in the field, and by having the peripheral speed of the disks 67 equal to the ground speed it will be seen that such grasping is in the nature of a gentle stroking of the undersize asparagus spears and does not result in injury thereto.

The rubber disks continue to embrace and hold each cut asparagus spear, with its butt projecting radially outwardly, until the asparagus spear reaches about the ten o'clock position of the disks as viewed in FIG. 2 at which position the peripheral portions 70 of the rubber disks 67 start to separate from each other as indicated at 75 in FIG. 1. At this time the butts of the cut asparagus spears are laid down on the upper side of concave lower stretch 145 of an endless belt indicated at 146. This belt passes around a roller 148 journalled, as indicated at 149, to a bearing bracket 150 fast to one main longitudinal side frame beam 25 and around rollers 147, 151 and 152 suitably journalled in a bearing bracket 153 carried by the opposite main longitudinal side frame bar 25. These rollers 147, 151, 152 are arranged in the relationship shown to provide vertically moving stretches in the belt 146 which embrace the upper stretch 155 of an inclined belt 156 the lower end of which passes around a pulley 158 journalled in a bearing bracket 159 carried by the corresponding main longitudinal side frame bar 25. The belt 146 moves transversely of the line of movement of the machine and the belt 156 moves longitudinally of the line of movement of the machine, receiving the spears of asparagus butt first from the lower stretch 145 of the belt 146 and elevating them to a suitable receiver (not shown) for transportation from the field.

It has been found desirable that the lower operative stretch 145 of the cross belt 146 be trough-shaped to properly receive and retain the harvested spears thereon. This trough-shaped form can be maintained in any suitable manner as by having this belt stretch travel over a row of transverse rollers 157 which, as shown in FIG. 2, can be arranged with their axes at an angle to one another to provide a trough-shaped way supporting this belt stretch 145.

*Operation*

The asparagus harvester of the present invention is designed to harvest only growing asparagus spears designated at A which have reached a predetermined height, this height being such as to classify the spears as being of premium grade and which grade commands the highest price. The harvester rejects the growing spears B which have not reached the height to classify them as premium grade, these immature spears being left in the field to grow to premium grade height and to be harvested by the harvester at a later day. By this means the harvester can be set to cut only premium grade spears and by using the harvester at frequent intervals during the asparagus harvesting season the entire crop can be harvested as a premium grade crop to obtain the highest price and with minimum loss of spears. Also by frequent harvesting of only premium grade spears, all of the strength of the plants is put into the production of such spears and an increased yield of such premium grade spears is obtained. A feature also lies in the asparagus spears being cut a predetermined distance below ground as is conventional and required for premium grade spears.

Asparagus is commercially planted in rows of substantial width involving different methods of cultivation, but most generally involving building up ridges of soil in the rows through the transfer of earth in making furrows between the rows. The present harvester can be adapted to any method of cultivation, this involving setting the effective height of the individual picking arms 47 so as to correspond to the method of cultivation or to the particular extent of cultivation, i.e. the height of the ridges, at the time of harvesting, this condition varying during the season. Such adjustment is achieved by turning the various cranks 55 in the direction to adjust the picking arms 47 up or down to suit the contour of the field at the time of harvesting. Turning these arms, as shown in FIG. 2, moves the screws 54 up or down thereby to raise or lower the front ends of the various picking arms 47 which pivot on the cross shaft 39 and to adjust the rear ends of these arms to the contour of the field lengthwise of the rows.

When so adjusted the apparatus is ready for use and can be drawn through the asparagus field along the successive rows thereof by means of a farm tractor (not shown) coupled to its draw bar 28. The picking arms 47 are arranged in closely spaced side-by-side relation to extend lengthwise of the line of travel, the spacing between these arms from one another being only that necessary to permit the pair of rubber disks or rotors 67 to travel along the exterior faces of the side plates 48 of these picking arms. Accordingly as the machine moves along the row of asparagus all of the spears A and B pass below one or the other of the picking arms 47 and the tips of the spears A enter the lower parts of the chambers or ways 50 in the several picker arms 47, these chambers or ways being open at their bottoms for this purpose.

As the machine moves along its wheels 34, through the chain 36, drives the shaft 39, this in turn, through the several chains 62, driving the shaft 60 of each of the picker arms 47. This rotates each pair of the rubber disks or rotors 67 fast to the end of these shafts 60. These disks are rotated so that their peripheral speeds are equal to the ground speed of the machine and rotate counter-clockwise as viewed in FIG. 2 so that the lowermost extremity of each of these disks is stationary with respect to the ground. Undersized spears, designated as B, travel through the space under the picking arms 47 and are left to grow to harvestable size. Those spears, designated at A, which are of harvestable size are of sufficient height so that their tips enter the bottom of the way or chamber 50 of one or the other of the picking arms 47 and encounter the rubber head 101 at the bottom of the corresponding depending sensing arm 100. The lower end of this arm is thereby moved rearwardly with respect to the direction of travel of the machine and its upper extremity 102 is moved forwardly thereby to move forwardly the operating member 104 of the normally open microswitch 105 and also to move its opposite operating member 106 forwardly, this being permitted by the slot 111 in the lever 109 which contacts this last operating member of the switch.

Closing the normally open microswitch 105 opens the normally closed solenoid valve 123 and closes the normally open solenoid valve 124 associated with the particular picker arm 47 whose sensing arm 100 has been actuated by an asparagus spear A of harvestable size. This permits fluid preferably oil under pressure to flow from pressure line 128 through the now open solenoid valve 123 and line 130 to the top of the corresponding cylinder 88. This also permits fluid from the bottom of the cylinder 88 to flow through line 140 and now closed solenoid valve 124 to its drain 141.

The pressure of the fluid in the cylinder 88 is such as to cause a very rapid downward movement of its piston and the piston rod 86, this downward movement of the piston rod 86 swinging downwardly the rear ends of the two cutter arms 82 between the two plates 48 housing the sensing arm 100 so actuated by the asparagus spear A of harvestable size. As these cutter arms, swinging about the pivot pin 80 ride down the cam surfaces 93 of the cam tracks 94, the springs 81 spread the free or rear ends of these arms so that when these arms encounter the ground, as illustrated by dotted lines in FIG. 2, their ends are spread apart beyond the vertical planes of the opposing faces of the side plates 48 containing these arms, thereby to embrace the harvestable asparagus spear A even though the base of this spear is in whole or part beyond the extreme side of the path of the arm 47. Further this spreading movement of the free ends of the cutters arms 82 tautens the wires 91 connecting the same so as to make them effective in cutting off the spear below the ground. In actual practice this cutting off of the spear below ground is a function of the forward movement of the entire machine, the hydraulic mechanism serving merely to lower the cutter arms 82 and cross wires 91 rapidly to a point below the ground and the forward movement of the machine serving to cut the asparagus spear so that the asparagus spear is cut below ground perpendicular to its major axis instead of being cut off at an angle. All features of the invention are not, however, limited to the employment of the forward movement of the machine for the actual cutting since this can also be accomplished by appropriate movement of the member providing the cutting edge such as with the modified form of the invention shown in FIGS. 16–21. The asparagus harvester developed for the practice of the present invention travelled along the ground at a speed of from approximately three to three and one half miles per hour.

It will be noted, however, that since the cutting edge 91 is moved rapidly in a vertical direction, it will not strike an undersize spear B even if the latter should stand quite closely behind the sensed spear A. Thus it will be seen that a feature of the invention resides in the movement of the cutting edge in an L-shaped path, that is, first in a rapidly descending vertical direction and then in a horizontal direction to cut the spear off squarely instead of at an angle.

With the asparagus spear A cut as illustrated in FIG. 2 and the cutter arms 82 in the dotted line position shown, the lower end of the cylinder 88 has been swung counterclockwise to such position that the transversely bent end 112 of the push rod 113, 115 has been pushed to the end of its slot 111 and has swung the arm 109 counterclockwise a sufficient distance to press and operate the movable part or operating member 106 of the microswitch 105. This not only opens this normally open microswitch but also pushes out the other operating member 104 of this microswitch so as to restore the sensing arm 100 to its proper pendant position to be actuated by the tip of the next asparagus spear A of harvestable size which it encounters. The opening of the microswitch 105 closes the solenoid valve 123 and opens the solenoid valve 124. Accordingly fluid from the pressure tank 129 and supply line 128 flows through the now open solenoid valve 124 and line 140 to the bottom of the cylinder 88 and fluid in the top of the cylinder 88 flows through the line 130 and now closes solenoid valve 123 to its drain 139. Accordingly the piston rod 86 is retracted to draw the two cutter arms 82 quickly upwardly to the full line position shown in FIG. 2. In this movement these two arms ride up the opposing cam surfaces 93 of the opposed cam tracks 94 thereby to draw together the free ends of these arms and avoid having high frictional contact with the side plates 48 of the associated arm 47. It will be noted that in this movement the arms pass the head 101 of the sensing arm 100 but since this movement of the cutting arms is lengthwise of the sensing arm 100, that is vertical, even if one of these arms should inadvertently contact the rubber head 101, it would not actuate the microswitch 105, the operation of this microswitch being in response to a horizontal fore-and-aft movement of the rubber head 101 only.

As previously explained, the two rubber disks 67 of each picking arm 47 under consideration have been rotating along the exterior faces of its side plates 48, the friction involved in this movement being reduced by the rollers 76. The peripheries of each pair of these rubber disks 67 are internally biased to contact each other and hence when the peripheries of the pair of rubber disks 67 leave the lower edge of the picker arm 47 under consideration they come into contact with each other and embrace and grasp the cut asparagus spear A. It will be appreciated that this grasping of the asparagus spear follows its having been cut since the peripheries of the rubber disks 67 must be spread apart a sufficient distance to permit the free return of the free ends of the cutting arms 82. It will also be seen that the cam surfaces 93 are effective, in combination with the springs 81, to bring the free ends of the cutting arms 82 together to avoid contact with the peripheries of the rubber disks both when moving to cut the asparagus spear and also in returning to the elevated inoperative position.

The cut asparagus spear A is accordingly frictionally held between the peripheries of a pair of rubber disks 67 and to increase the sensitivity of these rubber disks in the rapid grasping of the cut asparagus spear it is shown as provided with the radial slits 71 providing the radial fingers 73 which are capable of individually coming together as rapidly as they are released from the lower ends of the side plates 48 of each picking arm 47.

The cut asparagus spear A is carried around between the peripheries of its two rubber disks 67 with its tip projecting toward the axis of rotation of these disks and until the spear reaches about a ten o'clock position as viewed in FIG. 2. At this position, as shown at 75 in FIG. 1, the peripheries of each pair of rubber disks 67 are drawn apart in reengaging the external faces of the side plates 48 of each arm 47. Accordingly the cut spear A of asparagus is released and it falls butt first upon the troughshaped lower stretch 145 of the belt 146, this troughshaped form being maintained by the rollers 157 as shown in FIG. 2. This stretch of the belt is travelling in the direction of the arrow shown in FIG. 1 and since the tip of each asparagus spear is restrained, by one rubber disk 67, from immediate movement along with the stretch 145 of the belt 146, its butt is drawn forwardly and each spear is drawn to a position in which it travels butt first along on the lower stretch 145 of the belt 146. It will be noted that in this transfer from the rubber disks 67 to the cross belt 146 each asparagus spear is, in effect, handled only from its butt end, the tip being merely restrained.

Similarly as the asparagus spear travels butt first over the roller 147, FIG. 14, its butt drops onto the discharge belt 156 and the spear is turned to travel butt first along with this belt by reason of the fact that its tip is temporarily restrained from leaving the cross belt 146 by the trough-shaped form of the latter and because the travel of these two belts is angular with respect to each other. Accordingly the asparagus spears travel butt first up with the discharge belt 156 to be deposited, again butt first, into a suitable receptacle (not shown) for transportation to the cannery or other destination.

For purposes of illustration each pair of rubber disks 67 are illustrated in FIG. 1 as carrying at least one or more asparagus spears, but it will be understood that such conditions do not obtain in actual practice the spacing of harvestable premium grade asparagus spears in the field being quite sparse as compared with the condition illustrated.

In FIGS. 16–21 is illustrated a modified form of cutting mechanism which cuts in the opposite direction from that illustrated in the preceding figures, namely, cutting against the direction of movement of the machine as compared with the preceding figures.

The numeral 160 represents a flat bracket or plate secured, as by welding, to one of the side plates 48 of each picking arm 47 above the rear end of the chain 62 within the way of chamber 50. To this supporting plate or bracket 160 is secured, as by bolts 161, a bracket 162 which projects rearwardly from the plate 160 and has a downwardly projecting rear portion 163. Near its upper end the bracket 162 is provided with a depending ear 164 to which the upper end of a cylinder 88a is secured by a horizontal pivot pin 89a so that the lower end of the piston rod 86a swings in the direction of travel of the machine when projected. This cylinder connects with the hydraulic lines 140 and 130 in the same manner as with the form of the invention shown in FIGS. 1–15 and its piston rod 86a is connected through a horizontal pivot 165 with the center of a lever 166 the upper end of which is pivotally connected, as indicated at 168, to the lower extremity 163 of the bracket 162. The lower end of the lever 166, respectively. The pivots 89a, 165, 168, to a tube 170 the forward end of which is pivotally connected, as indicated at 171, to the lower end of a link 172. The upper end of this link 172 is pivotally connected, as indicated at 173, to the bracket 162 intermediate the pivotal connections 89a and 168 for the cylinder 88a and the lever 166, respectively. The pivots 89a, 165, 168, 169 and 171 and 173 are all parallel, being arranged horizontally and transversely of the direction of movement of the machine. The rear end of the tube 170 is open and rotatably carries the shaft or stem 175 of a flat transverse cutter blade 176.

A cross pin 178 of this stem 175 rides in a pair of opposite slots 179 in the tube 170 each of which slots extends 90° around the tube as best shown in FIG. 21. One end of the pin 178 projects into the path of the cam surface 180 on a lateral extension 181 of the lever 166. A helical spring 185 is arranged in the tube 170 around the stem 175 and is connected at opposite ends to each to bias the stem rotatably toward the end of the slot 179 in which the knife blade 176 is horizontal as shown in FIG. 18.

The sensing mechanism for controlling the action of the cutting mechanism is the same as with the form of the invention shown in FIGS. 1–15 and hence the same reference numerals have been employed.

As with the form of the invention shown in FIGS. 1–15 when the head 101 of the depending sensing finger 100 contacts the tip of an asparagus spear A of marketable height, it is moved horizontally to introduce fluid into the upper end of the cylinder 88a and to relieve fluid from the lower end of this cylinder, this being through the electrical and hydraulic components illustrated in FIG. 13 and the description of the operation of which is not repeated. This fluid movement rapidly extends the piston rod 86a downwardly thereby to swing the lever 166 from the horizontal position shown in FIG. 16 to the depending position shown in FIG. 17. This also moves the tube 170 downwardly since it is pivoted to the outer end of the lever 166 and because of the differential in length between this lever 166 and the link 172, the tube 170 is moved from the approximately horizontal position shown in FIG. 16 to about the 45° angular position, with reference to the horizontal, shown in FIG. 17. At this same time the pin 178 leaves contacts with the cam surface 180 of the arm 181 fixed to the lever 166 and leaves the spring 185 free to turn the stem 175 of the cutter blade 176. This spring turns this stem until the pin 178 reaches the opposite ends of the 90° slots 179 in the tube 170. This turning of the stem brings the cutter blade 176 from the position of being in a generally vertical plane, as shown in FIGS. 16 and 19 to a generally horizontal plane below the ground as shown in FIGS. 17 and 18. This movement of the cutter blade is sufficiently rapid and so timed that it severs the sensed asparagus spear A. Either through the pusher rod 113, FIG. 13, or because of the return of the sensing finger 100 to its normal position, the fluid to the cylinder 88a is then reversed so that the cutting blade 176 and its arm 166 and link 172 are rapidly elevated to the nested inoperative position shown in FIG. 16. During this return movement, before the cutter blade 176 reaches the bottom edges of the side plates 48 of the arm 47, its pin 178 contacts the lower cam edge 180 of the arm 181 of the lever 166. This restrains the pin 178 and hence the further upward movement of the tube 170 causes this pin to rotate in the 90° slots 179 thereby to rotate the stem 175 of the knife blade 176 and bring the latter toward a generally vertical plane. This also winds up the helical torsion spring 185. Accordingly when the knife blade 176 enters the way or chamber 50 of the arm 47 it is in a vertical position and there is no danger of its striking either the side walls 48 or the sensing head 101.

It will be seen that this permits the use of a wider sensing head 101 than with the form of the invention shown in FIGS. 1–15 since in the form of the invention shown in FIGS. 1–15 the arms 82 of the cutter pass on opposite sides of the rubber head 101 of the sensing arm 100. However, no difficulty has been experienced with the form of the invention shown in FIGS. 1–15 because the mounting of each sensing arm 100 and its action upon the microswitch 105 is such that even if either arm 82 would touch the head 101 in its downward or upward movement it would not actuate or interfere with the sensing movement, the sensing action being a function wholly of the horizontal movement of the sensing finger 100 in the direction of the line of travel.

In FIGS. 22 and 23 a modified form of the rotor 66a is provided in the form of a pair of flexible rubber disks 67a designed to replace the rubber disks 76 of the form of the invention illustrated in FIGS. 1–15. Thus instead of the radially projecting fingers 73 provided by the radial slits 71 in the form of the invention shown in FIGS. 1–15, the rubber disks 67a are provided near their peripheries with axially extending fingers 200 which are arranged in opposition to one another and can interleave as shown. These fingers are shown as integral with the disks 67a and hence are resilient and yield when the disks are brought into embracing relation with the spears as above described. These fingers are provided in a number of series spaced at different distances inwardly from the periphery of each rotor and hence each spear is grasped by a plurality of these fingers so that they tend to hold the spear in the radial position in which it was received.

From the foregoing it will be seen that the present invention provides a very simple and effective method and apparatus which not only selectively harvests only those asparagus spears of harvestable, and preferably premium size, but also does this in such a manner that not only are the unharvested spears left uninjured to grow to premium grade and be subsequently harvested but also the harvested spear is gently grasped and moved, essentially butt first, to an assembling area with very gentle treatment, especially of the tip of the asparagus. It will further be seen that the advantages of the present invention flow primarily from the relation of the cutting and sensing mechanisms to the axial opening and closing action of the peripheral lips of a pair of rubber or flexible bodied rotors, it being essential for this purpose that the sensing mechanism be interposed between these peripheral lips at a point where they open up or spread to embrace the spear to be cut, and it also being essential that the cutting mechanism be so actuated with reference to these rotors that its cutting edge rapidly darts below the surface of the ground to sever the sensed asparagus spear in synchronism with the closing of the peripheral lips of the rotor so that the severed spear is gently caught by the rotors and does not fall to the ground. It will also be noted that in the modified form of the invention shown in FIGS. 22 and 23 the opposed axially projecting small flexible rubber fingers tend to hold the cut asparagus spears in the position in which they are originally received between the two rubber disks.

I claim:

1. An asparagus harvester, comprising a wheeled frame movable along an asparagus field, sensing means on said frame arranged to be actuated by tips of growing asparagus spears of predetermined height, means movably mounted on said frame providing a cutting edge extending transversely of the line of travel of the harvester in position to sever at its base the spear actuating said sensing means, means actuated by said sensing means and moving said means providing said cutting edge along said line of travel of the harvester to engage and sever the base only of the spear sensed thereby to cause it to fall by gravity toward the ground, means on said frame arranged to catch, subsequent to said severing, the spear severed by said means providing said cutting edge before falling flat on the ground, means moving said spear catching means at a speed much slower than said means providing said cutting edge to a receiving station, and means actuating said spear catching means to release said spear at said receiving station.

2. An asparagus harvester, comprising a wheeled frame movable along an asparagus field, sensing means on said frame arranged to be actuated by tips of growing asparagus spears of predetermined height, means movably mounted on said frame providing a cutting edge extending transversely of the line of travel of the harvester in position to sever at its base the spear actuating said sensing means, means actuated by said sensing means and moving said means providing said cutting edge along said line of travel of the harvester to engage and sever the base only of the spear sensed thereby to cause it to fall by gravity toward the ground, means on said frame arranged on opposite sides of the spear being severed and movable toward each other into contact with said spear to grasp, subsequent to said severing, the spear before falling flat on the ground, means moving said spear grasping means to transfer said spear to a receiving station, and means actuating said spear grasping means to release said spear at said receiving station.

3. An asparagus harvester, comprising a wheeled frame movable along an asparagus field, sensing means on said frame arranged to be actuated by tips of growing asparagus spears of predetermined height, means movably mounted on said frame providing a cutting edge extending transversely of the line of travel of the harvester in position to sever at its base the spear actuating said sensing means, means actuated by said sensing means and moving said means providing said cutting edge along said line of travel of the harvester to engage and sever the base only of the spear sensed thereby to cause it to fall by gravity toward the ground, a pair of concentric disks of soft, resilient flexible material journalled on said frame on opposite sides of the spear being severed and having peripheral portions biased axially toward each other and arranged to contact and grasp opposite sides of the spear being severed before falling flat on the ground, said means providing said cutting edge being arranged, in the inoperative position thereof, directly between the axis of said disks and said peripheral portions thereof, means spreading said peripheral portions apart just before reaching the spear being severed and providing a space in which said means providing said cutting edge moves to so sever the base only of said spear and to return to said inoperative position, means rotating said rotors to bring said grasped spear to a receiving station, and means at said receiving station spreading said peripheral portions apart to release the spear.

4. An asparagus picker as set forth in claim 3 wherein antifriction rollers are mounted to protrude from the face of each plate along which said corresponding peripheral portion passes to reduce friction between said plates and peripheral portions.

5. An asparagus picker, comprising a wheeled frame movable along an asparagus field, a pair of spaced vertical plates on said frame extending lengthwise of the line of movement of said frame to receive between them the tips of asparagus spears growing in said field, sensing means arranged adjacent said plates to be actuated by tips of growing asparagus spears of predetermined height passing between said plates, means arranged between and movably mounted on said plates providing a cutting edge extending transversely of the line of travel of the harvester in position to sever at its base the spear actuating said sensing means, means actuated by said sensing means and moving said means providing said cutting edge along said line of travel of the harvester to sever the base only of the spear sensed thereby to cause it to fall by gravity toward the ground, means arranged to catch, subsequent to said severing, the spear severed by said means providing said cutting edge before falling flat on the ground, said means providing said cutting edge being arranged, in the inoperative position thereof, directly between the axis of said disks and said peripheral portions thereof, means moving said spear catching means at a speed substantially slower than said means providing said cutting edge to a receiving station, and means actuating said spear catching means to release said spear at said receiving station.

6. An asparagus picker, comprising a wheeled frame movable along an asparagus field, a first horizontal transverse shaft journalled on said frame, at least one pair of spaced vertical plates journalled on said shaft to extend lengthwise of the line of movement of said frame to receive between them the tips of asparagus spears growing in said field, sensing means including a sensor arranged between said plates to be actuated by tips of growing asparagus spears of predetermined height passing between said plates, a cutter arranged between and movably mounted on said plates in position to sever at its base the spear actuating said sensing means, means actuated by said sensing means and moving said cutter to sever the spear sensed thereby, a second horizontal transverse shaft journalled on said plates to extend transversely of said line of movement of the frame, a pair of rotors fixed to said second shaft immediately outside said pair of plates and having flexible peripheral portions biased axially toward each other, and means driving said second shaft from said first shaft, and means rotating said shafts in the direction and at a speed so as to effect little relative movement between the ground and the sides of said peripheral portions nearest the ground, said plates permitting said peripheral portions to spring together at the zone of action of said cutter to grasp the cut spear from opposite sides and to carry it away from said zone of action of said cutter, and said plates subsequently spreading said peripheral portions axially apart to release said grasped spear at a receiving station.

7. An asparagus picker, comprising a wheeled frame movable along an asparagus field, a cutting member, means movably supporting said cutting member on said frame for downward and upward movement toward and from the ground, and means rapidly moving said cutting member downwardly to bring its cutting edge in front of the base of a spear of asparagus in the field to sever said spear in response to the forward movement of said frame.

8. An asparagus picker comprising a wheeled frame, a sensing member mounted on said frame to move in a horizontal direction at an elevation to touch growing spears of predetermined height and to be moved horizontally rearwardly thereby with reference to said frame, a cutting member arranged adjacent said sensing member, means movably supporting said cutting member on said frame for downward and upward movement toward and from the ground, means rapidly moving said cutting member downwardly to bring its cutting edge into engagement with the base of a spear of asparagus in the field, an actuator member, means moving said actuator member in one direction by said sensing member and in the opposite direction by the upward movement of said cutting member and means, actuating said cutting member in response to the movement of said actuator member in said one direction, said upward movement of said cutting member positively resetting said actuator member.

9. In an asparagus picker having a wheeled frame movable along an asparagus field, the combination therewith of a cutter comprising a pair of generally parallel arms pivoted at corresponding ends on said frame to swing about a horizontal axis extending transversely of the line of movement of said frame, a cutting member connecting the free ends of said arms, and means rapidly driving said free ends of said arms downwardly to bring said cutting member in front of the base of a spear of asparagus in the field to sever said spear at said base.

10. The combination set forth in claim 9 wherein said cutter is in the form of a flexible wire.

11. The combination set forth in claim 9 wherein means are provided for moving said free ends of said arms toward and from each other during their movement toward and from the base of a spear of asparagus.

12. In an apparatus picker having a wheeled frame movable along an asparagus field, the combination therewith of means for cutting growing asparagus spears of predetermined height at their bases, comprising a plurality of parallel vertical plates on said frame extending lengthwise of the line of movement thereof to travel over the growing asparagus spears, a pair of generally parallel arms arranged between each pair of said plates and pivoted to swing about a horizontal axis extending transversely of the line of movement of said frame, means biasing said arms away from each other, a flexible cutting member connecting the free ends of said arms, means rapidly driving said free ends of said arms downwardly to bring said cutting member in front of a spear of asparagus in the field to sever the same, and cam means on each pair of plates engaging said arms to bring them toward each other as they are moved upwardly.

13. In an asparagus picker having a wheeled frame movable along an asparagus field, the combination therewith of a cutter comprising an arm pivoted at one end to swing about a horizontal axis, a cutting member rotatably mounted on the free end of said arm to swing about an axis perpendicular to the axis of said arm, and means simultaneously rapidly driving said free end of arm downwardly and rotating said cutting member to bring said cutting member into a horizontal position at the base of a spear of asparagus in the field to sever said spear at its base.

14. In an asparagus picker having a wheeled frame movable along an asparagus field, the combination therewith of means cutting and transporting spears of growing asparagus, comprising a conveyor belt having an elevated, generally horizontal stretch moving transversely of the line of movement of said frame, means cutting the growing spears from the field, elevating the same and depositing them butt first on said stretch, a pulley at the downstream end of said stretch over which said stretch travels downwardly, and a second endless belt having a stretch travelling lengthwise of the line of movement of said frame alongside the portion of said first mentioned stretch travelling downwardly over said pulley whereby the spears of asparagus falling from said first mentioned stretch on rounding said pulley are caught by said second belt.

15. An asparagus harvester, comprising a wheeled frame movable along an asparagus field, sensing means on said frame arranged to be actuated by tips of growing asparagus spears of predetermined height, a cutter movably mounted on said frame in position to sever at its base the spear actuating said sensing means, means actuated by said sensing means and moving said cutter to engage and sever the spear sensed thereby, a pair of concentric rotors journalled on said frame on opposite sides of and having flexible peripheral portions flanking the spear being severed, a multiplicity of flexible fingers mounted around said peripheral portions at different distances from the periphery thereof in opposed axially extending relation to one another to grasp and embrace the spear being severed before falling to the ground, means rotating said rotors to bring said spear to a receiving station, and means at said receiving station spreading said peripheral portions of said rotors apart to release said spear from said flexible fingers.

References Cited by the Examiner

UNITED STATES PATENTS

| | | | |
|---|---|---|---|
| 1,938,264 | 12/33 | Templeton | 56—1 |
| 2,581,119 | 1/52 | Matteoli | 56—327 |
| 2,690,043 | 9/54 | Marihart | 56—327 |
| 2,763,114 | 9/56 | Carruthers | 56—1 |
| 2,767,544 | 10/56 | Turkington | 56—327 |
| 2,780,904 | 2/57 | Bowie et al. | 56—328 |
| 2,791,878 | 5/57 | Kepner | 56—327 |

T. GRAHAM CRAVER, *Primary Examiner.*

CARL W. ROBINSON, RUSSELL R. KINSEY,
*Examiners.*